United States Patent [19]

Kanemaru

[11] Patent Number: 4,932,436

[45] Date of Patent: Jun. 12, 1990

[54] BALL VALVE

[75] Inventor: Tonaharu Kanemaru, Kitakoma, Japan

[73] Assignee: Kitz Corporation, Japan

[21] Appl. No.: 410,082

[22] Filed: Sep. 20, 1989

[30] Foreign Application Priority Data

Apr. 28, 1989 [JP] Japan .................................. 1-50638

[51] Int. Cl.⁵ .............................................. F16K 15/18
[52] U.S. Cl. .................................. 137/596; 137/614.17
[58] Field of Search ............................ 137/596, 614.17

[56] References Cited

U.S. PATENT DOCUMENTS

| 1,228,060 | 5/1917 | Schulder | 137/596 |
| 1,889,805 | 12/1932 | Johnson | 137/596 |
| 3,146,792 | 9/1964 | Donnelly et al. | 137/614.17 |
| 4,371,146 | 2/1973 | Mese et al. | 137/614.17 X |

FOREIGN PATENT DOCUMENTS 128576 8/1983 Japan ............................ 137/614.17

Primary Examiner—Gerald A. Michalsky
Attorney, Agent, or Firm—Bruce L. Adams; Van C. Wilks

[57] ABSTRACT

A ball valve includes a valve casing accommodating therein an upstream ball seat and a downstream ball seat and defining a cavity between the two ball seats, a ball provided with a through hole, accommodated in the cavity and brought into sealing contact with the two ball seats at the outer periphery thereof, a valve stem having one end thereof fixed to the ball, a valve handle fixed to the other end of the valve stem, a check valve accommodated in the through hole of the ball and biased toward the upstream side, a path formed on the ball and, when the ball valve is closed, causing the downstream side and the cavity to communicate with each other, and a connection port formed on the valve casing so as to communicate with the cavity and having a free end thereof connected to one end of a nipple having the other end thereof covered with a cap. The ball opens and closes the ball valve through the valve stem by a rotating operation of the valve handle.

4 Claims, 3 Drawing Sheets

BALL VALVE

BACKGROUND OF THE INVENTION AND PRIOR ART STATEMENT

The present invention relates to a ball valve connected to pipe arrangement for the passage of cold or hot water, gas, etc. and, more particularly, to a multipurpose ball valve capable of opening and closing a fluid flow passage, preventing a fluid from a counter flow, discharging a fluid in pipe arrangement on the downstream side, and confirming whether or not a fluid leaks out of or escapes from the pipe arrangement on the downstream side or the ball valve per se.

A ball valve with a built-in check valve and a ball valve with a discharge port for a fluid in pipe arrangement on the downstream side have heretofore been proposed. However, there has not yet been proposed any ball valve with both a check valve and a discharge port.

In mounting a conventional ball valve with a built-in check valve, a discharge port has been formed in pipe arrangement on the downstream side. For this reason, when pipes are arranged vertically and a fluid flows upwardly, it is impossible to discharge a fluid present in a portion of the pipe arrangement between the ball valve and the discharge port.

In mounting a conventional ball valve with a discharge port, a check valve has been required to be mounted on pipe arrangement on the upstream side. This is because a fluid in the pipe arrangement on the downstream side cannot be discharged out if the check valve should be mounted on the pipe arrangement on the downstream side. However, even if the check valve is mounted on the downstream side, when a fluid is liquid, there is a fair possibility of the liquid present in a portion of the pipe arrangement between the ball valve and the check valve undergoing thermal expansion which will extraordinarily increase the internal pressure of the pipe arrangement to cause leakage of the liquid from portions of the pipe arrangement connected to the ball valve and check valve and cause malfunction of the ball valve and check valve. Furthermore, the ball valves of this type are complicated in construction of an inside fluid flow passage and in overall structure and, therefore, the manufacturing cost thereof will become high. In addition, since the discharge port is generally formed in the bottom of a valve casing for the ball valve, when pipes are arranged along the surface of a wall, it will be difficult to connect a pipe to the discharge port and to discharge a fluid through the discharge port.

OBJECT AND SUMMARY OF THE INVENTION

In view of the drawbacks described above, the present invention has been accomplished.

The main object of the present invention is to provide a multipurpose ball valve which is inexpensive, simple in structure and capable of opening and closing a fluid flow passage, preventing a fluid from a counter flow, discharging a fluid in pipe arrangement on the downstream side, and confirming whether or not a fluid leaks out of or escapes from the pipe arrangement on the downstream side or the ball valve per se.

To attain the object described above, according to the present invention there is provided a ball valve which comprises a valve casing having an upstream passageway and a downstream passageway for a fluid, accommodating therein an upstream ball seat and a downstream ball seat, and defining a cavity between the upstream and downstream ball seats; a ball provided with a through hole, accomodated in the cavity, and brought into sealing contact with the two ball seats at the outer periphery thereof; a valve stem having one end thereof fixed to the ball; a valve handle fixed to the other end of the valve stem; the ball being rotated by a rotating operation of the valve handle for opening and closing the ball valve; a check valve accommodated in the through hole of the ball and biased toward the upstream passageway of the valve casing; a path formed on the ball and, when the ball valve is closed, causing the downstream passageway and the cavity to communicate with each other; and a connection port formed on the valve casing so as to communicate with the cavity, and having a free end thereof connected to one end of a nipple having the other end thereof covered with a cap.

The above and other objects, characteristic features and advantages of the present invention will become more apparent to those skilled in the art as the disclosure is made in the following description of a preferred embodiment of the invention, as illustrated in the accompanying drawings.

DETAILED DESCRIPTION OF THE PREFERRED EMBODIMENT

Figure 1:
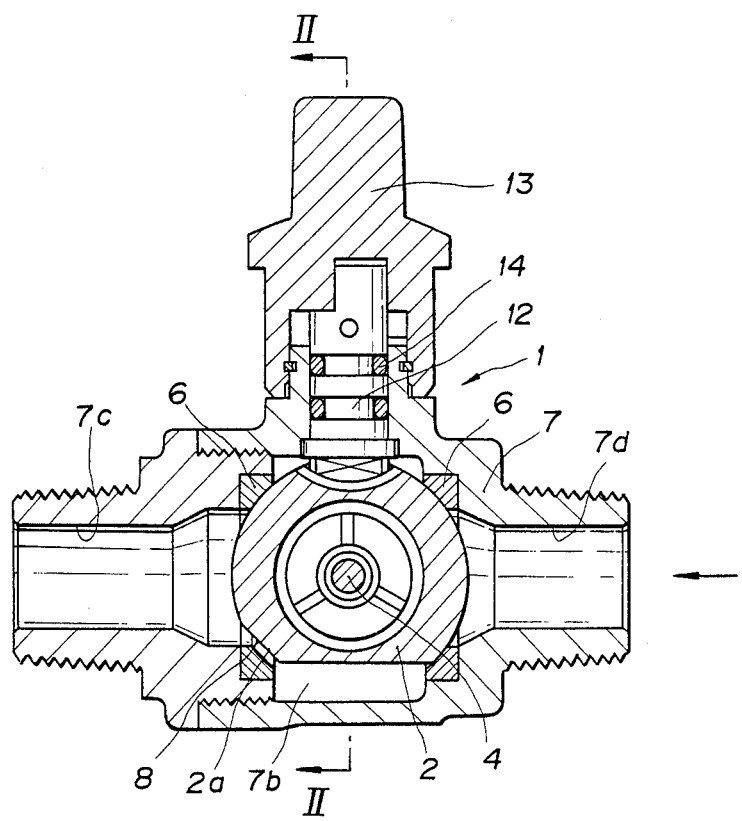
FIG. 1 is a longitudinal cross section illustrating one embodiment of the ball valve according to the present invention.
Figure 2:
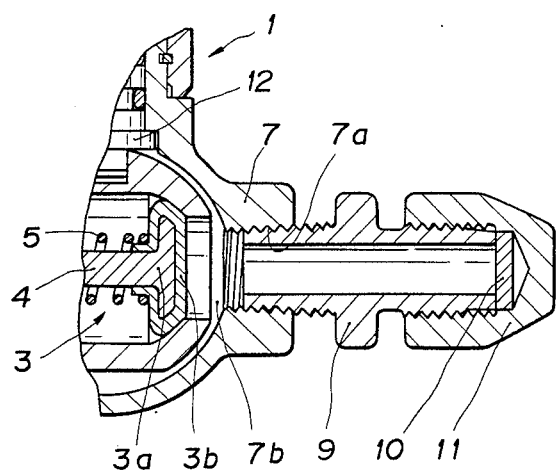
FIG. 2 is a partially cutaway cross section taken along line II—II in FIG. 1.
Figure 3:
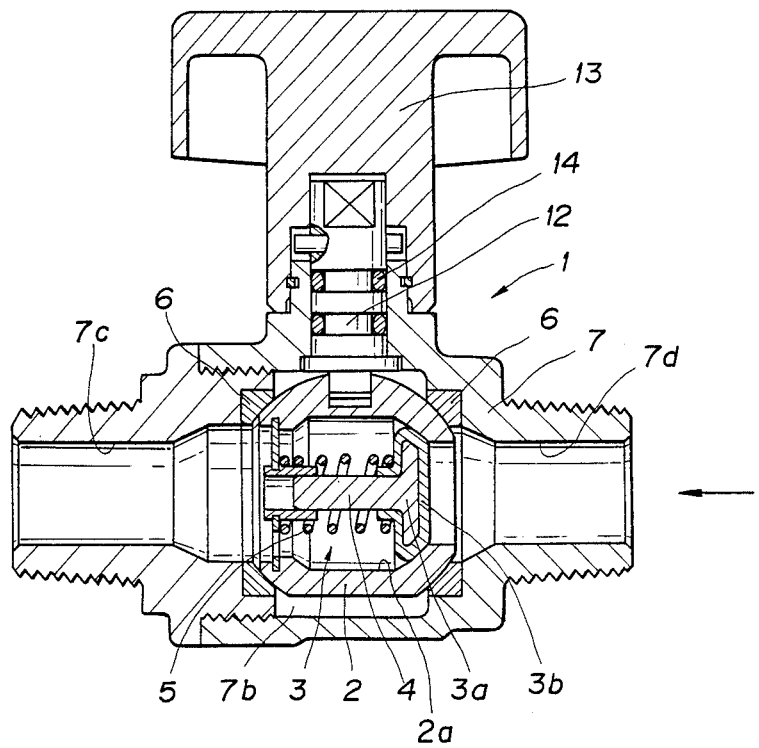
FIG. 3 is a longitudinal cross section illustrating the ball valve in a closed state.

FIGS. 1 and 2 illustrate a closed state of a ball valve 1 according to the present invention, and FIG. 3 an open state of the ball valve 1.

As illustrated in FIG. 3, a valve casing 7 of the ball valve 1 has an upstream passageway 7d and a downstream passageway 7c for a fluid, accommodates therein a ball seat 6 on the upstream side and a ball seat 6 on the downstream side, and defines a cavity 7b between the two ball seats 6. A ball 2 having a through hole 2a is accommodated within the cavity 7b with its peripheral surface brought into sealing contact with the two ball seats 6. A valve stem 12 has one end thereof fixed to the ball 2 and the other end thereof fixed to a valve handle 13. The ball 2 is rotated via the valve stem 12 by rotating the valve handle 13, thereby opening and closing the ball valve 1. Within the through hole 2a of the ball 2 there is accommodated a check valve 3 which is of a lift type having a mushroom valve head 3a coated with an elastic material 3b such as rubber and a valve body 4 biased by a coil spring 5 toward the upstream passageway 7d. The cavity 7b communicates with a connection port 7a formed on a side portion of the valve casing 7 (FIG. 2). As illustrated in FIG. 2, a nipple 9 has one end thereof connected to the connection port 7a and the other end thereof covered by a cap 11 through a gasket 10. As illustrated in FIG. 1, a path 8 is defined between a flat surface 2a formed by cutting part off the ball 2 and the ball seat 6 on the downstream side, and serves to communicate the cavity 7b and the downstream passageway 7c with each other when the ball valve 1 is in its closed state. Reference numeral 14 in FIGS. 1 to 3 designates an O-ring.

The valve handle 13 can be rotated by 90 degrees in the normal direction and also be 90 degrees in the reverse direction. This 90-degree rotation of the valve handle 13 is transmitted to the ball 2 through the valve stem 12, and the resultant 90-degree rotation of the ball 2 causes the ball valve 1 to open as shown in FIG. 3 or be closed as shown in FIGS. 1 and 2.

In the closed state of the ball valve 1 as shown in FIG. 3, a fluid (not shown) flowing in a direction indicated by the arrow in FIG. 3 pushes the check valve 3 open and flows from the upstream side to the downstream side. When the pressure on the downstream side becomes higher than the pressure on the upstream side, the check valve 3 is closed to prevent a counter flow of the fluid.

When the ball valve 1 in its open state is closed as shown in FIG. 1 by rotating the valve handle 3 by 90 degrees, the fluid is prevented from flowing from the upstream side to the downstream side by the sealing contact between the peripheral surface of the ball 2 and the ball seat 6 on the upstream side. In the closed state, when the fluid is liquid, by detaching the cap 11 to open the connection port 7a, the liquid passes successively through the path 8, cavity 7b and connection port 7a and is discharged out. In the case of vertical pipe arrangement with liquid flowing upwardly, therefore, the liquid on the downstream side can be completely discharged out.

In the closed state of the ball valve 1, when compressed air is supplied from the connection port 7a with the outlet of a pipe on the downstream side closed, the compressed air passes through the cavity 7b and path 8 into the pipe on the downstream side. If the pipe on the downstream side should have a hole, the compressed air will escape from the hole and can continuously be supplied into the pipe on the downstream side. In this way, it can be confirmed whether or not a fluid leaks from the pipe on the downstream side.

In the open state of the ball valve 1 and when a fluid flows, if the sealing contact between the ball 2 and at least one ball seat 6 is insufficient, part of the fluid will flow into the connection port 7a. Therefore, when the connection port 7a is opened, it can be confirmed whether or not the fluid leaks from between the ball 2 and at least one ball seat 6. Even when the pressure on the downstream side becomes higher than the pressure on the upstream side to cause the check valve 3 to fulfill its function, it can be confirmed in the same manner as described above whether or not the fluid leaks from between the ball 2 and at least one ball seat 6.

As described above, the path 8 for communicating the cavity 7b and the downstream passageway 7c with each other in the closed state of the ball valve 1 is formed by cutting part off the ball 2. This cutting work is easier than the work of perforating a ball or forming a groove in the peripheral surface of a ball. In this embodiment, the flat cut surface 2a is formed on the lower side of the ball 2 brought into sealing contact with the ball seat 6 on the downstream side in the closed state of the ball valve 1. However, this is by no means limitative and it may be formed on the upper side of the ball 2.

Since the check valve 3 is of a lift type having the mushroom valve head 3a coated with the elastic material 3b such as rubber and the valve body 4 biased by the coil spring 5 toward the upstream passageway 7d, as described above, there is no fear of any noise being produced when the check valve 3 opens or is closed and the check valve 3 can fulfill its function with exactitude irrespective of the posture of the ball valve 1 mounted on pipe arrangement.

One end of the nipple 9 is connected to the connection port 7a and the other end thereof is covered by the cap 11 via the gasket 10. Therefore, leakage of a fluid from the connection port 7a can be prevented. However, a fluid can be discharged out of the connection port 7a by detaching the cap 11 from the connection port 7a. Furthermore, by detaching the cap 11 from the connection port 7a, connecting a hose (not shown) to the connection port 7a and supplying compressed air into the connection port 7a through the hose, it is possible to confirm whether a fluid leaks from a pipe on the downstream side. Thus, the connection port 7a serves not only as a fluid discharge port but also as a fluid leakage detecting means. In the illustrated embodiment, the connection port 7a is formed on a side portion of the valve casing 7. This is by no means limitative. However, the connection port 7a formed on a side portion of the valve casing 7 is advantageous in that even if pipe arrangement is along a wall surface, a tube or hose can be easily attached to the connection port 7a to facilitate discharge of a fluid and examination of fluid leakage. In addition, one end of the nipple 9 is covered by the cap 11 via the gasket 10 in the illustrated embodiment. However, this is by no means limitative. For example, the nipple 9 and the cap may be brought into metal-to-metal contact with each other without using the gasket 10.

Furthermore, in the illustrated embodiment, the 90-degree rotation valve handle 13 is used. However, this is by no means limitative. A 180-degree rotation valve handle may be used. In this case, when the valve handle is rotated by 180 degrees, the ball 2 is rotated by 180 degrees to position the path 8 on the upstream side. Thus, it is possible to discharge a fluid in a pipe on the upstream side and examine fluid leakage from a pipe on the upstream side.

As has been described in the foregoing, according to the present invention there can be provided a multipurpose ball valve which is inexpensive, simple in structure and capable of opening and closing a fluid flow passage, preventing a fluid from a counter flow, discharging a fluid in pipe arrangement on the downstream side, and confirming whether or not a fluid leaks out of the pipe arrangement on the downstream side or out of the ball valve per se. Furthermore, since a fluid is not hemmed in, an otherwise possible extraordinary increase of the pressure in pipe arrangement between the upstream and downstream sides can be prevented, thereby elimnating leakage of the fluid from portions of the pipe arrangement connected to the ball valve and check valve and malfunction of the ball valve and check valve.

What is claimed is:
1. A ball valve comprising:
a valve casing having an upstream passageway and a downstream passageway for a fluid, accommodating therein an upstream ball seat and a downstream ball seat, and defining a cavity between said upstream ball seat and said downstream ball seat;
a ball provided with a through hole, accommodated in said cavity, and brought into sealing contact with said upstream ball seat and said downstream ball seat at the outer periphery thereof;
a valve stem having one end thereof fixed to said ball;

a valve handle fixed to the other end of said valve stem;

said ball being rotated by a rotating operation of said valve handle for opening and closing said ball valve;

a check valve accommodated in said through hole of said ball and biased toward said upstream passageway of said valve casing;

a path formed on said ball and, when said ball valve is closed, causing said downstream passageway and said cavity to communicate with each other; and a connection port formed on said valve casing so as to communicate with said cavity, and having a free end thereof connected to one end of a nipple having the other end thereof covered with a cap.

2. The ball valve according to claim 1, wherein said path is formed flat by cutting part off the outer periphery of said ball.

3. The ball valve according to claim 1, wherein said check valve is of a lift type having a mushroom valve head coated with an elastic material and a valve body biased by a coil spring toward said upstream passageway.

4. The ball valve according to claim 1, wherein said connection port is formed on a side portion of said valve casing.

* * * * *